United States Patent [19]

Stephenson et al.

[11] Patent Number: 5,089,683

[45] Date of Patent: Feb. 18, 1992

[54] DEVICE FOR PRODUCING A CONSTANT LENGTH LASER BEAM AND METHOD FOR PRODUCING IT

[75] Inventors: Gerald H. Stephenson, Swindon-Wiltshire, England; Russell M. Morgan, Indianapolis, Ind.

[73] Assignee: Union Carbide Coatings Service Technology Corporation, Danbury, Conn.

[21] Appl. No.: 584,099

[22] Filed: Sep. 18, 1990

[51] Int. Cl.$^5$ .............................................. B23K 26/08
[52] U.S. Cl. .............................. 219/121.78; 219/121.8
[58] Field of Search ...................... 219/121.68, 121.69, 219/121.78, 121.79, 121.8, 121.84, 121.82

[56] References Cited

U.S. PATENT DOCUMENTS

| | | | |
|---|---|---|---|
| 4,566,938 | 1/1986 | Jenkins, et al. | 219/121.69 X |
| 4,794,680 | 1/1989 | Meyerhoff et al. | 219/121.69 X |
| 4,806,727 | 2/1989 | Rückl | 219/121.68 |

FOREIGN PATENT DOCUMENTS 2415513  9/1979  France ............................ 219/121.68

OTHER PUBLICATIONS

"Laser-Strahlfuhrungs-systeme Gelenkarme Multiax", Carl Zeiss, West Germany, four pages of German article.

Primary Examiner—C. L. Albritton
Attorney, Agent, or Firm—Cornelius F. O'Brien

[57] ABSTRACT

A constant length laser device for use with laser generating means comprising a first moveable optical reflector carriage for deflecting a laser beam 180° onto a spaced apart second moveable optical carriage which further deflects the laser beam 90° onto a workpiece, such as a printing roll, to be laser treated and wherein the first and second carriages are synchronized to move in the same direction with the first carriage moving at a speed one half that of the second carriage so as to produce a constant length laser beam.

10 Claims, 1 Drawing Sheet

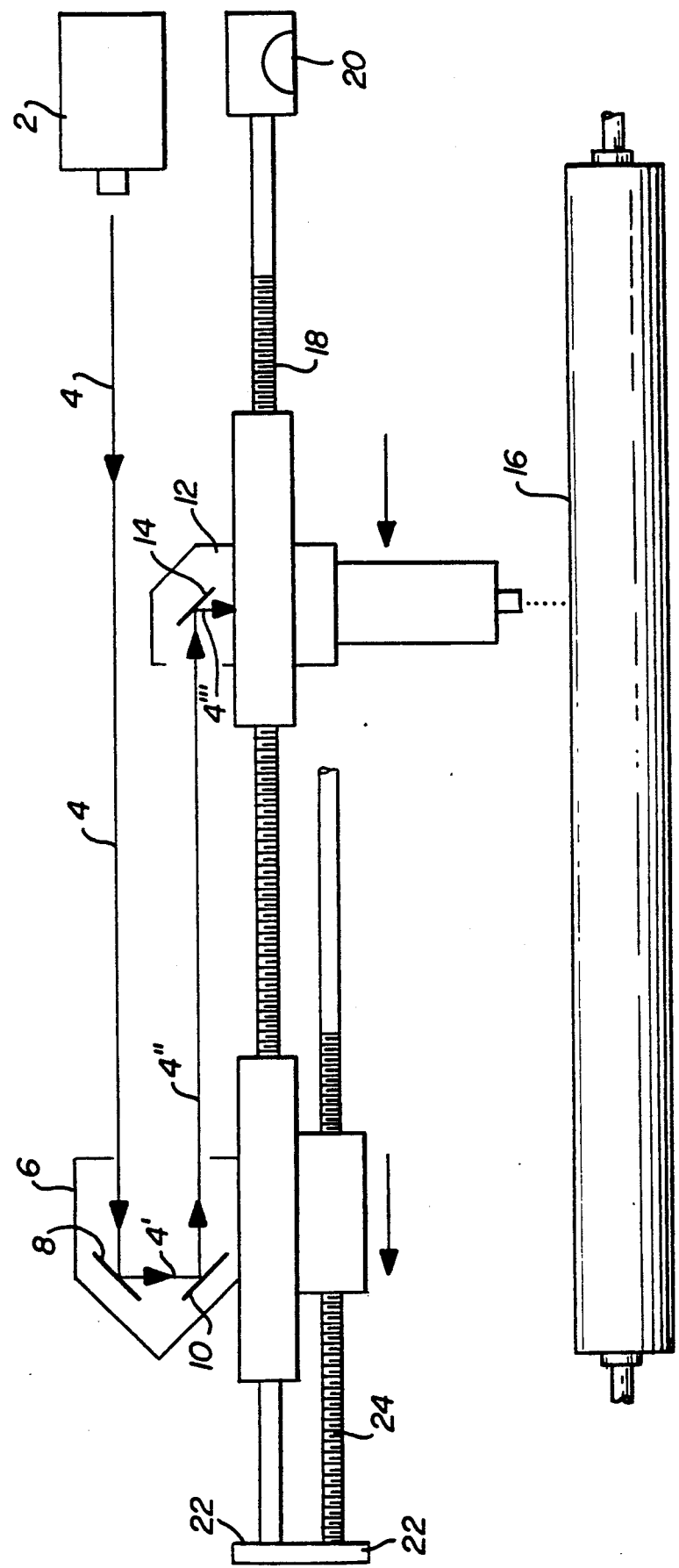

DEVICE FOR PRODUCING A CONSTANT LENGTH LASER BEAM AND METHOD FOR PRODUCING IT

FIELD OF THE INVENTION

The invention relates to a device for producing a constant length laser beam for treating a workpiece by using a fixed laser generating source to direct a laser beam onto a first reflector means for deflecting the beam 180° to a second reflector means which deflects the beam onto the workpiece and synchronizing the movement of the deflector means in the same direction over a workpiece with the first reflector means synchronized to move at one half the speed of the second reflector means so that the distance remains constant between the output of the laser and the work surface. The invention also relates to a method for producing the constant length laser beam.

BACKGROUND OF THE INVENTION

In recent years laser generators have found wide use in both commercial and scientific applications. Lasers are sources of light and the light emitted by a laser has a number of unusual properties that distinguish it from light emitted by conventional light sources. Among the unusual properties are a high degree of collimation, a narrow spectral line width, good coherence, and the ability to focus to an extremely small spot. Because of these unusual properties, there are many possible applications for which lasers are suited. One such application is the laser engraving of a liquid transfer article such as a roll, used in the printing industry to transfer a specified amount of a liquid, such as ink or other substance, from the liquid transfer article to another surface. The printing roll is usually produced by laser engraving various size cells into portions of the roll surface. The cells are filled with a liquid and then the liquid is transferred to the receiving surface. The printing rolls are rather large and thus to laser engrave the surface of the rolls a fixed laser generator is employed which directs the laser beam onto a reflector carriage arranged to deflect the laser beam onto the surface of the roll. The roll is generally rotated while the reflector carriage is moved along the roll parallel to the longitudinal axis of the roll. In this manner, the roll can be laser engraved to provide any particular printing configuration.

One drawback in employing the above method of laser engraving is that with the movement of the reflector carriage along the roll, fine line effects have been produced in repetitive bands along the length of the roll when using a $CO_2$ laser source. The bands have been found to occur at intervals of approximately 200 mm and within each band the lines occur at 2.8 mm spacing. Although the lines are visible on the roll and sometimes may effect the printed product, there appears to be no apparent difference in the geometry of the engraved cells in the surface of the roll. In addition to the line effect that has been observed, it is well known that control of beam diameter and divergence are essential to achieve consistent engraving along the length of a roll. This is of particular importance with respect to coarse engraved products such as applicator rolls.

Robotic arm devices have been disclosed in the art for use with laser generating means to produce a constant laser beam length for treating different areas of a workpiece. Although, the use of robotic arms can produce a constant laser beam length for treating various workpieces, it generally results in altering the polarization of the laser. In addition, the robotic arm is a rather complex device that could be quite expensive to make.

It is an object of the present invention to provide a device that can be used with a laser generating source to produce a constant laser beam length for treating various size and shape workpieces.

It is another object of the present invention to provide a device that can be used with a fixed laser generator to produce a constant laser beam length for laser engraving a workpiece such as a printing roll.

It is another object of the present invention to provide a device for use with a laser generator that can provide a constant laser beam length for laser treating workpieces that is cost effective to produce and easy to make.

It is another object of the present invention to provide a method for laser treating various workpieces from a fixed laser generator source while maintaining the length of the laser beam constant.

The above and further objects and advantages of this invention will become apparent upon consideration of the following description thereof.

SUMMARY OF THE INVENTION

The invention relates to a constant length laser device for use with laser generation means comprising a first moveable optical carriage containing at least two reflective surfaces arranged to receive a laser beam and reflect and deflect the laser beam 180°; a second moveable optical carriage containing at least one reflector arranged to receive the laser beam from the first moveable optical carriage and deflect the beam onto a workpiece; and motor means for synchronizing the movement of the first moveable carriage and second movable carriage in the same direction with the first moveable carriage synchronized to move at one half the speed of the second moveable carriage.

The invention also relates to a method for producing a constant length laser beam for a workpiece comprising the steps:

a) generating a laser beam and directing it to a first moveable reflector carriage for deflecting the beam 180° onto a second moveable reflector carriage for further deflecting the laser beam onto a workpiece; and b) synchronizing the movement of the first moveable reflector carriage and second moveable reflector carriage in the same direction over the workpiece with the first moveable reflector carriage adjusted to move at one half the speed of the second moveable carriage so that using a fixed laser beam generator, a constant length laser beam can be maintained for treating a workpiece.

By synchronizing the movement of both reflector carriages so that they move in the same direction over a workpiece with the speed of the first reflector carriage moving at one half the speed of the second carriage will insure that the length of a laser beam emitted from a fixed laser generator source will remain constant and that the polarization of the laser will not be altered or changed as could occur when using robotic arm devices. The synchronizing of the movement of the reflector carriages can be accomplished using any conventional technique such as a combination of belt feeds and gear arrangement. The essential requirement is that they both move in the same direction with the first reflector carriage moving at a speed equal to one half the speed of the second reflector carriage. As stated above, when the laser beam length is not constant for a $CO_2$ laser beam, line effects have been imparted to a ceramic coated anilox ink transfer roll during laser engraving. Although, not wanting to be bound by theory, it is considered possible that although the main wavelength of $CO_2$ laser light is 10.6 microns, other wavelengths between 9.6 and 11 microns are present which may set up an interference pattern when using one single moving reflector carriage. By using two synchronizing moveable reflector carriages, a constant beam length can be achieved to not only eliminate the line effect but also allow control of beam diameter to enhance the focusing characteristics of the laser beam. A constant length laser beam will result in producing a closer approach to a constant focal spot which in turn will improve the uniformity of the cell shape on laser engraved rolls. In addition, setting up procedures are facilitated when using a constant length laser beam while eliminating the need for refocusing of the laser beam during engraving.

Although, again not wanting to be bound by theory, it is considered possible that there exists two laser cavities, one within the physical laser itself and one external to the laser between the roll surface and the output mirror of the laser. This external cavity is, as the carriage moves down the roll, constantly tuning and untuning itself around the 10.6 micron wavelength. A resonator cavity can then exist between the roll surface and the output mirror with light energy being reflected from the roll and coupled back into the laser itself via the laser output window. This reflected energy would then interfere with the stability of the laser causing power variation. This variation could cause the stripes visible on the roll.

The constant laser beam device of this invention is ideally suited for laser engraving printing cylindrical rolls with a selected pattern of liquid retaining cells. Generally, the roll is rotated at a selected speed and the two synchronized reflector carriages are moved on top of the roll in a direction parallel to the longitudinal axis of the roll. The movement of the reflector carriages is also selected to impart engraved cells in the surface of the roll having a predetermined desired dimensional contour.

In the preferred embodiment of the invention, the first reflector carriage would employ two reflector mirrors disposed to form a 90° angle and arranged so that the first mirror is disposed at a 45° angle to the laser beam. Thus when the laser beam contacts the first mirror, the laser beam will be reflected and deflected 90° whereupon it will contact the second mirror. The second mirror will cause the beam to deflect another 90° so that the laser beam is reflected back in a direction parallel to its original direction. The reflected laser beam is then directed to a mirror in the second reflector carriage in which the mirror is disposed at an angle, preferably 45°, so that the laser beam can be deflected onto a workpiece. Thus by using a fixed laser source generator in conjunction with the device of this invention, a laser beam having a constant length can be produced to laser treat different areas on a workpiece.

Since high power laser beams can damage metallic mirrors, most mirrors for use with lasers are made of multilayer dielectric coatings. The mirrors can be made by vacuum deposition of thin layers of dielectric materials on a transparent substrate. Some typical materials would include titanium dioxide, zirconium dioxide, magnesium fluoride and thorium fluoride. The mirrors can be made by evaporating alternate layers of a material with a high index of refraction and one with a low index of refraction. Each layer may have an optical thickness (physical thickness times index of refraction) equal to one quarter of the wavelength at which it will be used. Proper choice of indexes of refraction and number of layers will allow production of a mirror with nearly any desired reflection. These multilayer mirrors are much less susceptible to damage by a power laser light than conventional metallic mirrors. Usually a laser cavity can consist of one mirror that is almost 100% reflecting and one mirror that is partially reflecting and partially transmitting, to allow emission of some of the light as the useful output of the laser.

A wide variety of laser machines are available for forming cells in workpieces such as rolls. In general, lasers capable of producing a beam or pulse of radiation of from 0.0001 to 0.4 joule per laser pulse for a duration of 10 to 300 microseconds can be used. The laser pulses can be separated by 30 to 2000 microseconds depending on the specific pattern of cell desired. Higher or lower values of the energy and time periods can be employed and other laser-engraved techniques readily available in the art can be used for this invention.

Although the invention is ideally suited for use in engraving ceramic and metal carbide surfaces disposed on cylinders or rolls, it should be understood that the invention could also the used on other surfaces such as flat as well as cylindrical surfaces. Preferably for liquid transfer rolls, the rolls could comprise an aluminum or steel substrate coated with any material which can be pulse laser engraved. Suitable ceramic coatings, such as a refractory oxide or metallic carbide coating, may be applied to the surface of the roll. For example, tungsten carbide-cobalt, tungsten carbide-nickel, tungsten carbide-cobalt chromium, tungsten carbide-nickel chromium, chromium-nickel, aluminum oxide, chromium carbide-nickel chromium, chromium carbide-cobalt chromium, tungsten-titanium carbide-nickel, cobalt alloys, oxide dispersion in cobalt alloys, aluminum-titania, copper based alloys, chromium based alloys, chromium oxide, chromium oxide plus aluminum oxide, titanium oxide, titanium plus aluminum oxide, iron based alloys, oxide dispersed in iron based alloys, nickel and nickel based alloys, and the like may be used. Preferably chromium oxide ($Cr_2O_3$), aluminum oxide ($Al_2O_3$), silicon oxide or mixtures thereof could be used as the coating material, with chromium oxide being the most preferred.

The ceramic or metallic carbide coatings can be applied to the metal surface of the roll by either of two well known techniques; namely, the detonation gun process or the plasma coating process. The detonation gun process is well known and fully described in U.S. Pat. Nos. 2,714,563; 4,173,685; and 4,519,840, the disclosures of which are hereby incorporated by reference. Conventional plasma techniques for coating a substrate are described in U.S. Pat. Nos. 3,016,447; 3,914,573; 3,958,097; 4,173,685; and 4,519,840, the disclosures of which are incorporated herein by reference. The thickness of the coating applied by either the plasma process or detonation-gun process can range from 0.5 to 100 mils and the roughness ranges from about 50 to about 1000 $R_a$ depending on the process, i.e. detonation-gun or plasma, the type of coating material, and the thickness of the coating.

The ceramic or metallic carbide coating on the roll can be preferably treated with a suitable pore sealant such as an epoxy sealant, e.g. UCAR 100 epoxy available from Union Carbide Corporation (UCAR is a trademark of Union Carbide Corporation). The treatment seals the pores to prevent moisture or other corrosive materials from penetrating through the ceramic or metallic carbide coating to attack and degrade the underlying steel structure of the roll.

BRIEF DESCRIPTION OF THE DRAWINGS

The sole figure is a schematic view of the constant length laser beam device of this invention employing two moveable reflector carriages.

Specifically, the sole drawing shows a laser generating source 2, shown in the fixed position, transmitting a laser beam 4 to a first moveable reflector carriage 6. Reflector carriage 6 comprises a first reflector mirror 8 disposed 45° to the axis of the laser beam 4 so that a laser beam 4' is deflected 90° downwardly onto a second reflector mirror 10. Reflector mirror 10 is disposed 45° to the axis of the deflected laser beam 4' so that a laser beam 4" is deflected 90° thereby directing laser beam 4" back towards laser 2 and parallel to the axis of the initial laser beam 4. In line with the deflected laser beam 4" is a second moveable carriage 12 containing a reflective mirror 14 disposed at a 45° angle to laser beam 4". Upon contacting reflective mirror 14, laser beam 4" is deflected 90° downwardly onto a workpiece shown schematically as roll 16.

As is apparent from the drawing, as the reflector carriages 6 and 12 are moved to the left with reflector carriage 6 moving at one half the speed of reflector carriage 12, the laser beam length remains constant. Thus if reflector carriage 12 is moved to the left 4 inches, reflector carriage 6 will move to the left only 2 inches and the overall length of the laser beam will remain constant.

The movement of reflector carriage 12 is shown using leadscrew driving rod 18 operated from a conventional stepper motor 20. The leadscrew driving rod 18 is extended to couple with a belt drive 22 having a 2:1 reducing coupled to a leadscrew rod 24. In the operation mode, the motor 20 advances reflector carriage 12 and at the same time advances reflector carriage 6 except that reflector carriage 6 travels at only one half the speed of reflector carriage 12 due to the use of the belt drive 22 having a reduction ratio of 2:1 for leadscrew rod 24. Many other conventional means can be used to synchronize the movement of reflector carriages 6 and 12 and the reduction in the speed of reflector carriage 6 to only one half the speed of reflector carriage 12.

EXAMPLE

Ceramic coated rolls were laser treated in a conventional manner using only one moveable reflector carriage containing one mirror disposed at a 45° angle to the laser beam generated by a conventional laser device. While each roll was rotated, the reflector carriage was moved along the roll parallel to the longitudinal axis of the roll producing a plurality of cells on the surface of the roll. Upon examination of the rolls, it showed that a line appeared at intervals of approximately 200 mm and each line occurred at a 2.8 mm spacing. Identical ceramic coated rolls were laser treated in the same manner except that two reflector carriages were employed as shown in the drawing. After laser engraving, the rolls were examined and no line effects were detected. In addition, the set up adjustment for focus along the roll length was not necessary as is usually required for laser engraving rolls using conventional or standard techniques of only one reflector carriage.

As many possible embodiments may be made by this invention without departing from the scope thereof, it being understood that all matter set forth is to be interpreted as illustrative and not in a limiting sense.

What is claimed:

1. A constant length laser device for use with laser generating means comprising a first moveable optical reflector carriage containing at least two reflective surfaces arranged to receive a laser beam and deflect and reflect the laser beam 180°; a second moveable optical carriage containing at least one reflector arranged to receive the laser beam from the first moveable optical carriage and deflect the beam onto a workpiece; and means for synchronizing the movement of the first moveable carriage and second movable carriage in the same direction with the first moveable carriage synchronized to move at one half the speed of the second moveable carriage.

2. The constant length laser device of claim 1 wherein the first moveable optical reflector carriage contains two spaced apart reflective mirrors disposed at a 90° angle and wherein the second moveable optical reflector carriage contains one reflective mirror disposed to be in alignment with one of the reflective mirrors of the first moveable optical reflector carriage.

3. The constant length laser device of claim 1 wherein the means for synchronizing the movement of the first and second moveable carriages are leadscrew driving means.

4. The constant length laser device of claim 3 wherein the reflective mirror of the second moveable optical reflector carriage is disposed parallel to one of the reflective mirrors of the first moveable optical reflector carriage.

5. Method for producing a constant length laser beam for a workpiece comprising the steps:
   (a) generating a laser beam and directing it to a first moveable reflector carriage for deflecting the beam 180° onto a second moveable optical reflector carriage for deflecting the laser beam onto a workpiece; and
   (b) synchronizing the movement of the first moveable optical reflector carriage and second moveable optical reflector carriage in the same direction over the workpiece with the first moveable optical reflector carriage synchronized to move at one half the speed of the second moveable carriage so that using a fixed laser beam generator, a constant length laser beam can be maintained for treating the workpiece.

6. The method of claim 5 wherein in step (a) arranging a first reflective mirror in the first carriage at an angle of 45° with the axis of the laser beam to deflect the laser beam 90° and arranging a second reflective mirror in the first carriage at 90° to the first reflective mirror and 45° to the axis of the deflected laser beam so as to receive the deflected laser beam from the first reflective mirror and further deflect the laser beam 90°; and arranging a reflective mirror in the second carriage at an angle of 45° with the axis of the reflected laser beam from the second reflective mirror and reflecting said beam onto a workpiece.

7. The method of claim 6 wherein in step (a) the deflected beam is directed onto a cylindrical workpiece at an angle of 90° with the longitudinal axis of the cylindrical workpiece.

8. The method of claim 7 wherein in step (b) the cylindrical workpiece is rotated while the first carriage and the second carriage are moved along the cylindrical workpiece parallel to the longitudinal axis of the cylindrical workpiece.

9. The method of claim 8 wherein the cylindrical workpiece is a liquid transfer roll.

10. The method of claim 9 wherein the liquid transfer roll is a ceramic coated liquid transfer roll.

* * * * *